United States Patent [19]

MacKenzie

[11] Patent Number: 5,307,230
[45] Date of Patent: Apr. 26, 1994

[54] CIRCUIT BREAKER WITH PROTECTION AGAINST SPUTTERING ARC FAULTS

[75] Inventor: Raymond W. MacKenzie, Baldwin Boro, Pa.

[73] Assignee: Westinghouse Electric Corp., Pittsburgh, Pa.

[21] Appl. No.: 112,271

[22] Filed: Aug. 26, 1993

Related U.S. Application Data

[63] Continuation of Ser. No. 765,770, Sep. 26, 1991, abandoned.

[51] Int. Cl.⁵ .......................... H02H 3/26; H02H 9/08
[52] U.S. Cl. ........................................ 361/96; 361/93; 361/97
[58] Field of Search .................... 361/79, 85, 87, 93, 361/96, 97, 98, 105, 94

[56] References Cited

U.S. PATENT DOCUMENTS

| | | | |
|---|---|---|---|
| 3,858,130 | 12/1974 | Misencik | 335/18 |
| 3,999,103 | 12/1976 | Misencik et al. | 335/18 |
| 4,081,852 | 3/1978 | Coley et al. | 361/45 |
| 4,347,541 | 8/1982 | Chen et al. | 361/96 |
| 4,658,323 | 4/1987 | Dougherty | 361/93 |

Primary Examiner—A. D. Pellinen
Assistant Examiner—S. W. Jackson
Attorney, Agent, or Firm—M. J. Moran

[57] ABSTRACT

A circuit breaker includes an electronic trip device which responds to sputtering arc-type faults. Level detectors compare the current in the protected circuit to a plurality of threshold levels and timers time the intervals that the current remains above each threshold, with the threshold levels and intervals selected to generate a response envelope for a trip signal which approximates, with a selected margin, the response of the protected circuit to introduction of a selected inductive load such as the starting of a motor into the circuit. If the sensed current falls below a threshold level which was being timed, the associated timer is not cleared unless the current falls below the lowest threshold, so that if the sensed current increases above the associated threshold, timing resumes where it left off, and a trip signal will be generated sooner than for an initial excursion above the threshold. Both analog and digital timer implementations are presented.

12 Claims, 3 Drawing Sheets

CIRCUIT BREAKER WITH PROTECTION AGAINST SPUTTERING ARC FAULTS

This application is a continuation of application Ser. No. 07/765,770, filed Sep. 26, 1991, now abandoned.

BACKGROUND OF THE INVENTION

1. Field of the Invention

This invention relates to circuit breakers and more particularly to a circuit breaker with an electronic trip unit which responds to sputtering arc-type faults.

2. Background Information

Conventional residential circuit breakers have a thermal trip device which responds to persistent overcurrents of moderate magnitude to provide a delayed trip and a magnetic trip device which responds instantaneously to overcurrents of large magnitude. Thus, the fault current must reach a predetermined magnitude, for example, ten times rated current, for the instantaneous trip to occur, or the overcurrent must sustain a predetermined average value over a given time interval to implement the delayed trip.

There is a type of fault, however, which may not produce either the peak magnitude required for the instantaneous magnetic trip, or the sustained average overcurrent necessary for the delayed trip, yet it may pose a fire hazard. This is the intermittent or sputtering arc-type of fault. Such a fault can occur, for instance, between two conductors that are in close proximity, but not touching, so that an arc is struck between the conductors. This arc can produce a temperature high enough to melt the copper in the conductor. The melted droplets of copper can ignite flammable materials in the vicinity. However, the resistance of the wiring may be high enough to limit the peak current and the ac current cyclically passes through zero to extinguish the arc so that the average current is low. Thus, the conventional circuit breaker does not respond to the fault, although a hazard exists. This is especially true in the case of a stranded wire extension cord where an individual strand can be melted at a relatively low fault current.

As sufficient voltage is required to strike the arc of a sputtering arc fault, this type of fault typically occurs at the peak of the ac voltage waveform thereby resulting in a step increase in current. Switching of some residential loads also produces step increases in current. For instance, an iron which is turned on at the peak of the voltage waveform results in a step increase in current; however, the magnitude of the step is less than the rated current of the circuit breaker. In addition, inrush currents, such as those produced by the starting of a motor, also rise rapidly, although not as rapidly as an arc-type fault. Furthermore, inrush currents tend to decay exponentially while faults maintain a constant high value, or drop to zero in the case of a sputtering arc.

There is a need for a circuit breaker which can respond to a sputtering arc fault.

There is also a need; however, for such a circuit breaker which can distinguish between acceptable inrush currents and overcurrents produced by sputtering arc faults.

There is an additional need for such a circuit breaker which is reliable and economical.

SUMMARY OF THE INVENTION

These and other needs are satisfied by the invention which is directed to a circuit breaker which compares a sensed signal representative of current in the protected circuit to a plurality of threshold levels and which times the intervals that the sensed signal remains above each of these levels. If any of these time intervals are exceeded, the circuit breaker is tripped. The threshold levels and timing intervals are selected to approximate, with a selected margin, a response envelope for generation of the trip signal which approximates, with a selected margin, the response of the protected circuit to a selected inductive load. When the sensed signal falls below a previously exceeded threshold, the accumulated time that the sensed signal was above that level is retained, so that if the overcurrent again reaches that threshold level, timing is resumed from where it left off. Thus, as in the case of a sputtering arc fault, where the current can drop off and rise again, a trip signal will be generated when the total selected time for that threshold level has been exceeded even though the current can intermittently fall below that level. The timing intervals are reset when the sensed signal falls below the lowest threshold level. Even then, the intervals are cleared at a very slow rate so that if the current again exceeds one of the thresholds, the interval will be shorter before a trip is generated.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
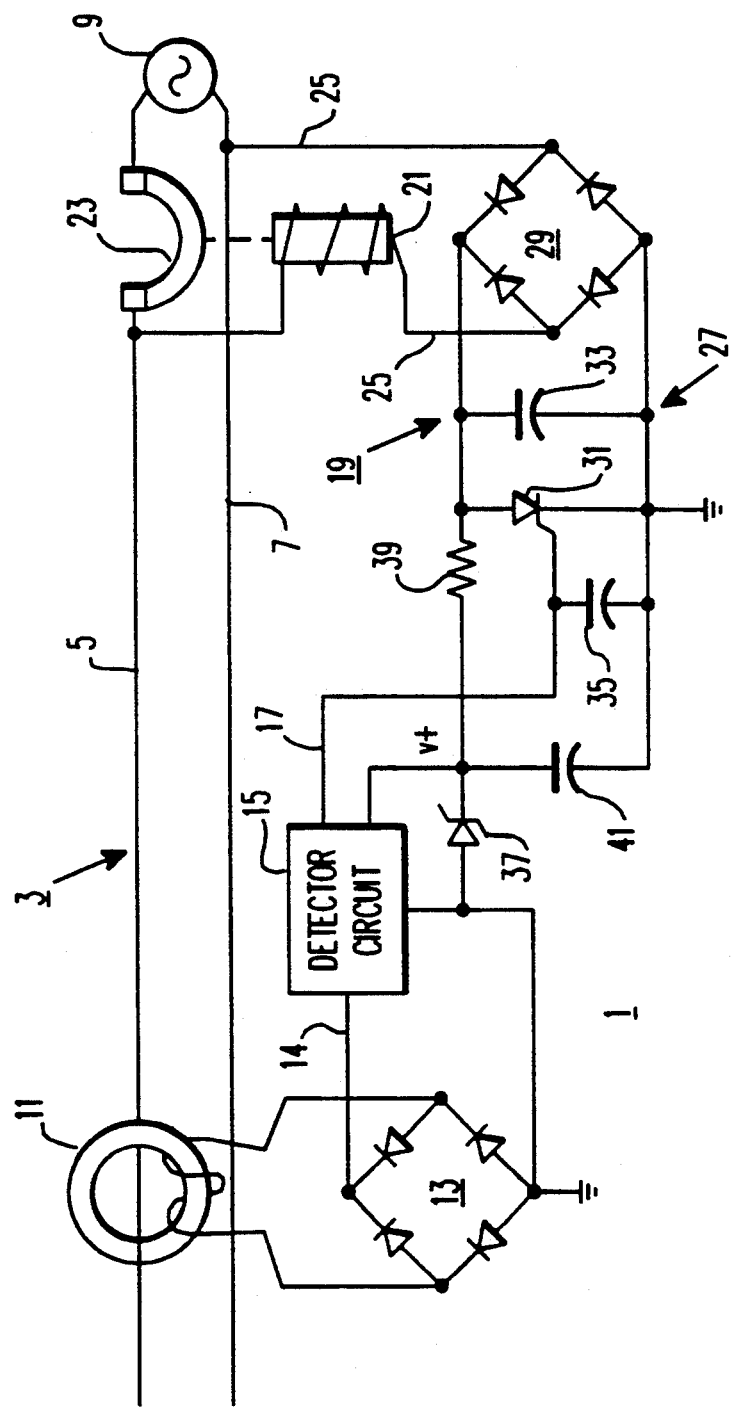
FIG. 1 is a schematic diagram of a circuit breaker in accordance with the invention shown in relation to a protected electric circuit.

FIG. 1 illustrates a circuit breaker 1 in accordance with the invention for protecting a one phase electrical system 3 which includes a line conductor 5 and a neutral conductor 7 energized by a 60 Hz source 9. The circuit breaker 1 includes a sensor 11 for sensing current in the line conductor 5. Preferably, the sensor 11 is a di/dt sensor which senses the rate of change of the current in the line conductor 5. A suitable di/dt sensor is a mutual inductor having a low permeability core, such as an air core or a powdered iron core. The sensed di/dt signal is full wave rectified in the bridge circuit 13 with the resultant pulsed dc signal applied to a detector circuit 15 through lead 14 connected to the dc terminals of bridge 13. As will be more fully discussed below, the detector circuit 15 compares the rectified sensed signal to a number of reference signals and times the intervals that the sensed di/dt signal remains above each of these thresholds. If the rectified di/dt signal remains above any of the reference signals for the associated interval, a trip signal is generated on a lead 17 which is connected to a trip circuit 19.

The trip circuit 19 includes a trip solenoid 21 which when energized opens circuit breaker contacts 23 to disconnect the protected portion of the electrical system 3 from the ac source 9. The trip solenoid 21 is energized from the protected electrical system 3 through lead 25 and is controlled by control circuit 27 which is energized by a bridge circuit 29 connected in series with the trip solenoid 21 by the lead 25.

The control circuit 27 includes a silicon controlled rectifier (SCR) 31 connected across the dc terminals of the bridge 29. The gate of the SCR 31 is connected to the lead 17 from the detector circuit 15. Capacitors 33 and 35 protect the SCR from high frequency spikes.

A zener diode 37 energized by bridge 29 through current limiting resistor 39 generates a V+reference voltage for the detector circuit 15. Capacitor 41 is a filter.

When the circuit breaker is closed closing the contacts 23, the capacitor 33 charges. This charging current is insufficient to energize the trip solenoid 21. Current drawn by the V+supply is also insufficient to generate a trip. With the capacitor 35 charged and the SCR 31 off, no appreciable current flows through the trip solenoid 21, and hence, the electrical system 3 remains connected to the ac source 9. When the detector circuit 15 generates a trip signal on the lead 17, the SCR 31 is turned on providing a low resistance path for current which is sufficient to energize the trip solenoid 21 to open the contacts 23. Opening of the contacts 23 deenergizes the trip circuit 19, however, the circuit breaker contacts 23 remain open until reset.

Figure 2:
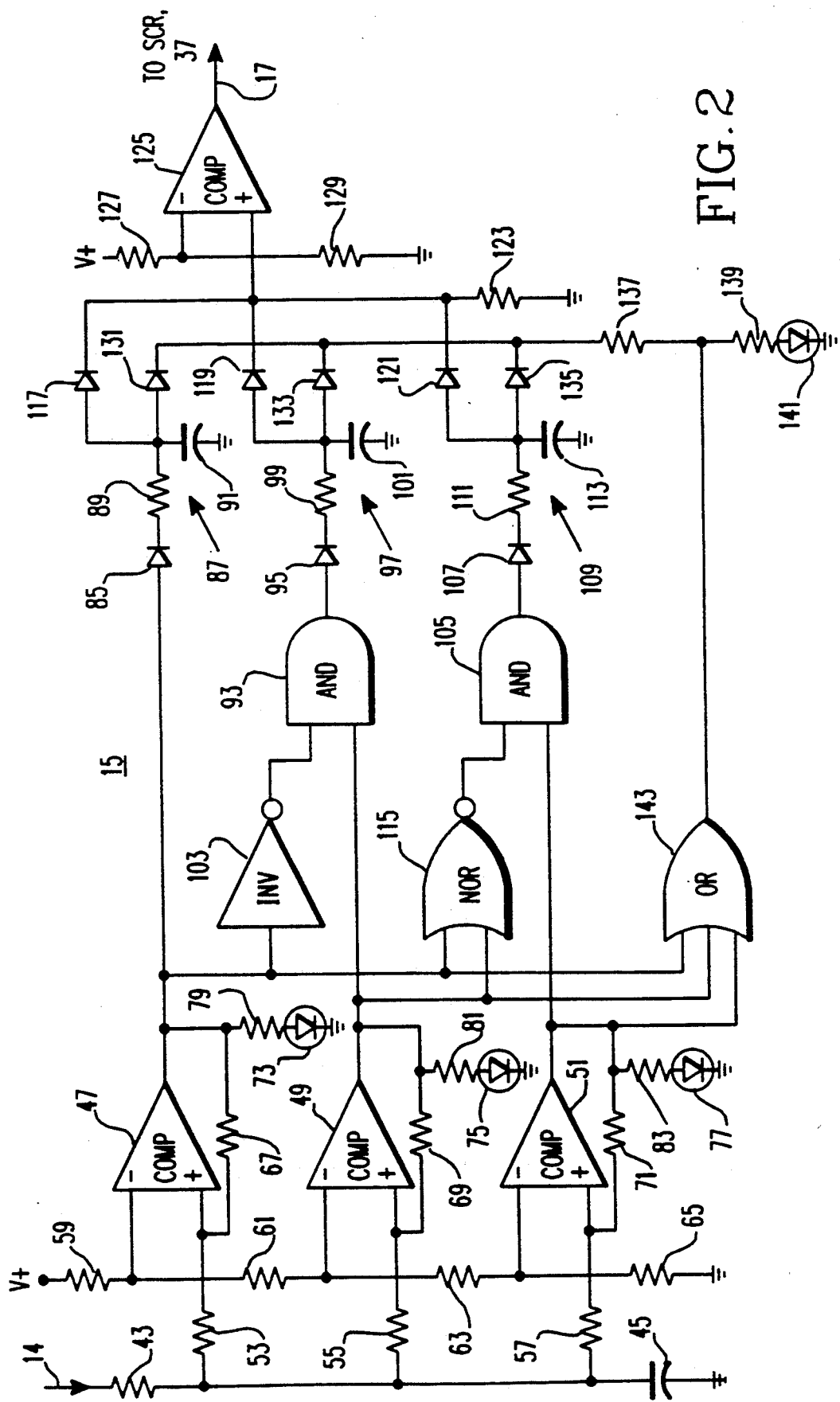
FIG. 2 is a schematic circuit diagram of one embodiment of a detector circuit which forms a part of the circuit breaker shown in FIG. 1.

An analog implementation of the detector circuit 15 is illustrated in FIG. 2. In the detector circuit 15, the full wave rectified sensed di/dt signal provided on lead 14 is filtered by an RC filter comprising resistor 43 and capacitor 45. A plurality of level detectors (three in the exemplary embodiment) in the form of comparators 47, 49 and 51 compare the filtered dc di/dt signal to a plurality of reference voltages. The sensed signal is applied to the non-inverting inputs of the comparators 47, 49 and 51 through input resistors 53, 55 and 57, respectively. The reference voltages which are applied to the non-inverting inputs of the comparators are generated by a voltage divider which includes resistors 59, 61, 63 and 65 connected in series between the regulated voltage supply V+ and ground. Feedback resistors 67, 69 and 71 are selected to provide a positive feedback or hysteresis in an amount greater than the magnitude of the ripple on the capacitor 45. Indicators in the form of LED's 73, 75 and 77 are turned on to provide a visual indication when the sensed di/dt signal exceeds the reference voltages applied to the comparators 47, 49 and 51, respectively. Resistors 79, 81 and 83 limit current through these LED'S.

The output of the comparator 47 is applied through a diode 85 to a timer 87 formed by the series connected resistor 89 and capacitor 91.

The output of comparator 49 is applied through AND gate 93 and diode 95 to a timer 97 which includes resistor 99 and capacitor 101. The AND gate 93 is controlled by the output of the comparator 47 through inverter 103. Similarly, the output of the comparator 51 is applied through AND gate 105 and diode 107 to a timer 109 which includes a resistor 111 and capacitor 113. The AND gate 105 is controlled by the outputs of both the comparators 47 and 49 through NOR gate 115.

The voltages across the capacitors 91, 101 and 113 are applied through diodes 117, 119 and 121, respectively, and across a resistor 123 to the non-inverting input of a comparator 125 having a threshold voltage applied to its inverting input by a voltage divider comprising the resistors 127 and 129 and energized by the regulated voltage V+. Each of the capacitors 91, 101 and 113 is also connected through a diode 131, 133 and 135, respectively, to a discharge resistor 137. The outputs of each of the comparators 47, 49 and 51 are ORed in OR gate 143, the output of which is connected to the discharge resistor 137. A resistor 139 and an LED 141 are connected from the output of the OR gate 143 to ground.

The operation of the detector circuit 15 of FIG. 2 is as follows. The level of the sensor signal supplied on the input lead 14 is continuously compared with the reference values in the comparators 47, 49 and 51. The outputs of the respective comparators are time delayed by the timers 87, 97 and 109; however, at any given time only the output of the comparator associated with the highest reference voltage which is exceeded is passed through to the respective timer. Thus, if the sensor signal exceeds the reference applied to the comparator 47, AND gate 93 is inhibited through inverter 103 to block timing of the output of comparator 49 and AND gate 105 is disabled through NOR gate 115 to inhibit timing of the output of comparator 51. When the delay selected by the timer 87 has expired so that the voltage across the capacitor 91 minus the forward drop of diode 117 exceeds the reference voltage applied to comparator 125, a trip signal is generated on the output lead 17.

If the sensor signal falls below the threshold of comparator 47 before a trip signal is generated, but remains above the threshold of comparator 49, AND gate 93 is enabled and timer 97 begins timing out. If the sensor signal remains above the threshold of comparator 49 for the selected time interval, the comparator 125 will generate a trip signal.

If the sensor signal falls below the threshold of comparator 49 before the timer 97 times out, but remains above the threshold of comparator 51 AND gate 105 is enabled by NOR gate 115 and the timer 109 is activated. Again, if this timer times out, a trip signal is generated by the comparator 125.

The delay accumulated in the respective timers is retained as long as the sensor signal remains above the threshold of any of the comparators 47, 49 or 51. This is implemented by the OR 143 which raises the voltage at the junction between the resistors 137 and 139 to prevent discharge of the capacitors 91, 101 and 113 of the timers. Thus, if the level of the sensor signal rises again above the threshold of a higher level comparator, the associated timer picks up timing at the point where it left off, and a trip signal will be generated when the accumulated elapsed time set by the timer has expired. When the sensor signal falls below the threshold of the comparator 51, the timer capacitors are discharged through the resistor 137. The resistor 137 is selected so that the discharge time constant is much larger than the charging time constant so that if overcurrent conditions return, a trip will be generated sooner than for an initial overcurrent condition. The LED's 73, 75 and 77 are turned on when the thresholds of the associated comparators have been exceeded. This provides a visual indication that an overcurrent condition exists which could result in a trip and the relative severity of the overcurrent. The LED 141 provides a redundant indication, when it is energized, that overcurrent conditions exist. Alternatively, only the LEDs 73, 75 and 77 or just the LED 41 could be provided.

The threshold reference voltages of the comparators 47, 49 and 51 and the time constants of the timers 87, 97 and 109 are selected to generate an envelope which approximates the exponential decay of a step function.

This envelope can be set so that it exceeds, but follows, the response which would be generated by the introduction of an inductive load, such as the starting of a motor, in the electrical system 3 protected by the circuit breaker. Thus, the circuit breaker would not trip on the starting of the motor, but would provide short delay response for faults, and would be especially useful for responding to low overcurrent but persistent faults such as sputtering or intermittent arc faults.

Figure 3:
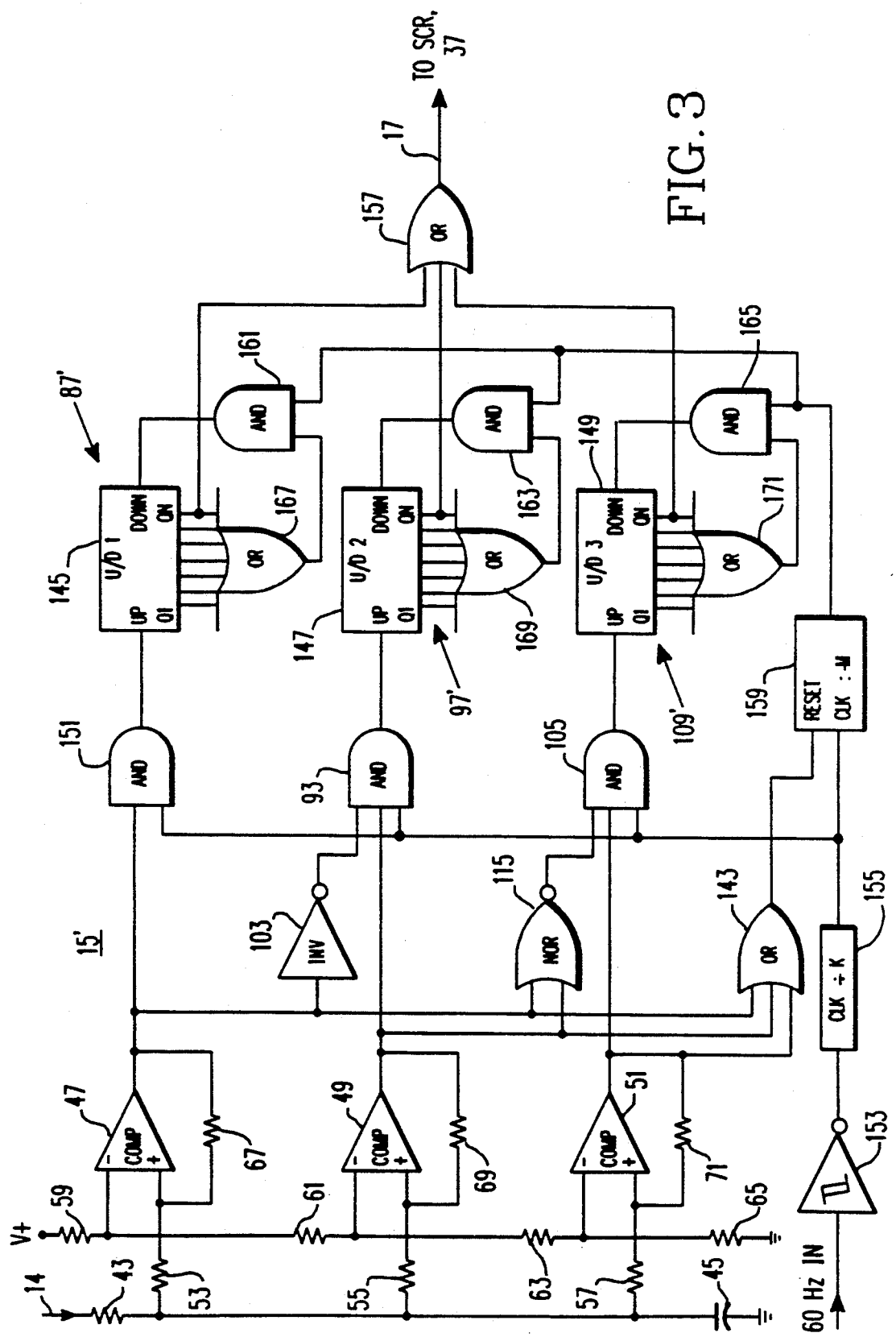
FIG. 3 is a schematic circuit diagram of another embodiment of the detector circuit which forms a part of the circuit breaker shown in FIG. 1.

FIG. 3 illustrates a hybrid analog/digital implementation of the detector circuit. Components in this detector circuit 15' which are identical to components in the analog circuit of FIG. 2 are identified by like reference characters. This circuit 15' includes digital delay or timer circuits 87', 97', and 109', respectively, associated with the comparators 47, 49 and 51, respectively.

The timers 87', 97' and 109' each include an up/down counter 145, 147 and 149, respectively. Each of the counters 145, 147 and 149 have the number of stages required for the respective time delays. The output of the comparator 47 is applied through an AND gate 151 to the count-up input of the counter 145. Similarly, the outputs of comparators 49 and 51 are applied to the count-up inputs of the counters 147 and 149, respectively, through the AND gates 93 and 105. These AND gates are enabled by clock pulses. The clock pulses are generated from the 60 Hz of the electrical system 3 by a Schmitt trigger 153. Since the delay intervals are long compared with the period of the 60 Hz of the electrical system, the pulses generated by the Schmitt trigger 153, are divided down by a factor of K by divider 155. The last stages of the counters 145, 147 and 149 are ORed by OR gate 157 to generate the trip signal on lead 17 when any of the counters times out.

As in the case of the circuit of FIG. 2, only the counter in the circuit 15' associated with the comparator having the highest threshold which is exceeded counts at any given time. The counters 145, 147 and 149 are reset by clock pulses from divider circuit 159 which divides the clock pulses down further by a factor of M so that the counters are reset at a slower rate than that at which they count up. The reset pulses from the divider 159 are applied through AND gates 161, 163 and 165 to the count-down inputs of the counters 145, 147 and 149, respectively. These AND gates 161, 163 and 165 are enabled by outputs from OR gates 167, 169 and 171 which OR the bits of the associated counters. Thus, the AND gates 161, 163 and 165 pass pulses from the divider 159 to the count-down inputs of the counters 145, 147 and 149 until the counts reach zero. The OR gates 167, 169 and 171 prevent the counters from rolling over after they reach zero. Reset pulses are generated by the divider 159 only when none of the thresholds of the comparators 47, 49 or 51 are exceeded as determined by the OR gate 143 which holds the divider 159 at reset as long as a threshold of one of the comparators 47, 49 or 51 is exceeded. If desired, indicators such as the LEDs 73, 75 and 77 or the LED 141 can be included in the detector circuit 15' to provide a visual indication of the level of the overload current or to generally indicate an overload condition.

The electronic trip feature of the invention can be incorporated into a conventional circuit breaker having a magnetic instantaneous and a delayed thermal trip, such as the circuit breakers disclosed in U.S. Pat. Nos. 3,858,130; 3,999,103 or 4,081,852 which are hereby incorporated by reference. The present invention provides protection against faults such as sputtering arc faults in which the overcurrent is less than that required for an instantaneous magnetic trip, but greater than that required for a thermal trip. The additional components required by the invention are housed in the half of the circuit breakers of these patents housing the trip solenoid, and are connected to the trip solenoid which when energized rotates a lever extending through a partition to actuate the trip mechanism in the other half of the housing.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit breaker providing fault protection for an electric circuit, said circuit breaker comprising:
   sensing means providing a sensed signal which is representative of the rate of change of current in said electric circuit;
   detector means comparing said sensed signal with a plurality of threshold levels ranging from a selected high level to a selected low level;
   timer means generating a trip signal when said sensed signal exceeds any one of said threshold levels for an associated timing interval, said threshold levels and associated timing intervals selected to produce a response envelope for generation of said trip signal which approximates, with a selected margin, an exponentially decaying step function; and
   trip means responsive to said trip signal opening said electric circuit.

2. The circuit breaker of claim 1 wherein said timer means at any given time only times the highest threshold level exceeded.

3. The circuit breaker of claim 2 wherein said timer means retains accumulated time for a threshold which has been exceeded when said sensed signal falls below that threshold level, and picks up timing at the accumulated time if that threshold is again exceeded.

4. The circuit breaker of claim 3 wherein said timer means includes means clearing all time intervals when said sensed signal falls below said selected low level.

5. The circuit breaker of claim 1 including:
   instantaneous magnetic trip means responsive to current in said electric circuit greater than represented by said selected high level operating said trip means to open said electric circuit, and thermal trip means responsive to a persistent current in said electric circuit at a second selected magnitude lower than that represented by said selected low level operating said trip means to open said electric circuit.

6. A circuit breaker providing fault protection for an electric circuit, said circuit breaker comprising:
   sensing means providing a sensed signal which is representative of the rate of change of current in said electric circuit;
   a plurality of level detectors each detecting a different level of said sensed signal from a selected high level to a selected low level;
   a plurality of timer means each associated with a different level detector and each having a selected timing interval which times out and generates a trip signal when the associated level detector has detected the selected level of said sensed signal for the selected timing interval;

means freezing said timer means associated with detectors for which said sensed signal has fallen below a threshold level of the associated level detector, until said sensed signal again exceeds the threshold level of the associated level detector; and trip means responsive to said trip signal generated by any of said timer means opening said electric circuit.

7. The circuit breaker of claim 6 including means clearing each of said timer means when the sensed signal falls below said selected low level.

8. The circuit breaker of claim 7 wherein each of said timer means comprises a series resistor-capacitor circuit, said means of said timer means comprises a discharge path for said capacitors, and said means freezing said timer means comprises means blocking said discharge path.

9. The circuit breaker of claim 8 wherein said clearing means comprises discharge resistor means and diode means connecting each of said capacitors for flow of current only from said capacitors to said discharge resistor means, and wherein said means blocking discharge of said capacitors comprises means responsive to the sensed signal exceeding the threshold level of any level detector to raise the voltage on said discharge resistor to reverse bias said diode means.

10. The circuit breaker of claim 7 wherein said timer means each equal an up/down counter and means applying pulses to said counter to count up when the threshold level of an associated level detector is exceeded, wherein said means clearing each of said timer means comprises means applying pulses to said counters to count down, and wherein said means freezing said timer means comprises means blocking the application of pulses to said counters to count down when the sensed signal is above the threshold level of any of said level detectors.

11. The circuit breaker of claim 6 including instantaneous magnetic trip means responsive to current in said electric circuit above current represented by said selected high level operating said trip means to open said electric circuit and thermal trip means responsive to current in said electric circuit of a selected magnitude lower than a current represented by said selected low level but above a normal rated current level and which persists for an interval greater than said selected timing intervals, operating said trip means to open said electric circuit.

12. The circuit breaker of claim 6 adapted for use in an electric circuit supplying current to an inductive load wherein said threshold levels and timing intervals are selected to produce a response envelope for generation of said trip signal which approximates, with a selected margin, an exponentially decaying step function.

* * * * *